United States Patent [19]

Sedran

[11] Patent Number: 4,534,493

[45] Date of Patent: Aug. 13, 1985

[54] APPARATUS FOR DISPENSING HIGH VISCOSITY THERMOPLASTIC MATERIALS

[75] Inventor: Roger H. Sedran, Wayne, N.J.

[73] Assignee: National Starch and Chemical Corporation, Bridgewater, N.J.

[21] Appl. No.: 519,875

[22] Filed: Aug. 3, 1983

[51] Int. Cl.³ .............................................. B67D 5/52
[52] U.S. Cl. .................................. 222/146.2; 222/259
[58] Field of Search ..................... 222/319, 146.2, 412, 222/413, 146.4, 146.5, 259

[56] References Cited

U.S. PATENT DOCUMENTS

| | | | |
|---|---|---|---|
| 2,764,847 | 5/1956 | Stahl | 222/146.4 X |
| 3,043,480 | 7/1962 | Wittrock | 222/146.5 |
| 3,282,469 | 11/1966 | Skonberg | 222/146.5 |
| 4,090,640 | 5/1978 | Smith et al. | 222/146.5 X |
| 4,323,174 | 4/1982 | Wood | 222/146.2 |

Primary Examiner—Stanley H. Tollberg
Attorney, Agent, or Firm—Edwin M. Szala

[57] ABSTRACT

Apparatus for dispensing high viscosity thermoplastic materials such as resins, sealants and hot melt adhesives from drums. The apparatus comprises a functional hollow cylinder vertically disposed with a screw extending through its length. The cylinder is attached to a movable platen which is positioned to enter the open container through the top and adapted to move downward to the container bottom. Heating means, for example, a serpentine heated coil is attached to the underside of the platen. In operation, the thermoplastic material in the container is melted or highly softened enabling the screw to "lift" the material in the upright cylinder to an opening or outlet provided in the upper portion of the cylinder.

6 Claims, 1 Drawing Figure

APPARATUS FOR DISPENSING HIGH VISCOSITY THERMOPLASTIC MATERIALS

BACKGROUND OF THE INVENTION

The present invention relates to apparatus for dispensing high viscosity thermoplastic materials from drums or other bulk shipping containers.

The apparatus of the present invention is useful for dispensing a variety of high viscosity thermoplastic materials such as resins, sealants and adhesives. Typical of such materials ordinarily shipped or stored in bulk shipping containers are the hot melt adhesives. Hot melt adhesives are an art recognized class of adhesives which may be defined as 100% solids thermoplastic materials which typically are solids at room temperature. Prior to use they are melted by heating, usually to 150°-200° C., and they are then applied to a substrate in their molten state. On cooling, they solidfy, thereby producing a bond.

Despite a long recognized need for effective systems for removing or dispensing such materials from the containers in which they are stored or shipped (such as, for example, 55-gallon drums), the commercially available systems have not proven to be entirely satisfactory for all applications. For example, U.S. Pat. No. 3,637,111 describes a heating and pumping system which requires the material to be heated into a substantially liquid state before it is pumped by a conventional pump such as a standard Pyles drum pump. Such a system would not be useful with those materials which do not convert into a substantially liquid state at practical temperatures. Furthermore, where the material is not to be used immediately, or could be used at a lower temperature than required to obtain a substantially liquid state, additional heating expenses are unnecessarily incurred by such a system in converting the materials into the substantially liquid state. Also, because of the time required for such a system to liquify the material, as a practical matter limits are imposed upon the speed with which the system can unload the material from the storage or shipping container. Finally, such a system cannot be used with materials which cannot be subjected to high shear forces of the type produced by a conventional pump.

Accordingly, it is an object of the present invention to provide apparatus capable of dispensing high viscosity thermoplastic materials without heating them into a substantially liquid state, thereby saving on heating costs and increasing the dispensing speed.

Another object is to provide such an apparatus which is useful with a wide variety of materials including those which cannot be subjected to high shear and those which do not assume a substantially liquid state at practical temperatures.

A further object is to provide such an apparatus which is inexpensive to manufacture, of sturdy construction, and easily operable.

SUMMARY OF THE INVENTION

According to the present invention, the apparatus comprises a movable platen or head carrying heating means such as, for example, circular concentric coils(s) on the underside thereof. The platen is in a shape to closely fit the interior of the container to be emptied. The heating means is disposed adjacent the underside of the platen and is preferably attached to provide a free space between the heating means and the underside of the platen. A screw conveyor extends through said platen in an upright, generally vertical disposition, and is operatively secured to said platen for movement therewith. The screw conveyor comprises a hollow cylinder with a screw extending through the length of the cylinder, configured and dimensioned to be snugly received by the cylinder, and provided with means for mechanically and controllably rotating the screw. The screw conveyor has an inlet disposed below the underside of the platen and an outlet disposed above the top of said platen. The outlet is ordinarily provided with tubing or piping which serves to transfer and dispense the thermoplastic material. Preferably, at least a portion of the cylinder is provided with heating means so that the material is not undesirably cooled during the dispensing operation.

As the material to be emptied softens or melts in the vicinity of the heating means, it is picked up by the screw and conveyed upwardly within the cylinder towards the outlet. The platen and heating means are gradually lowered as the material is emptied, and the process can be continued until the heating means reaches the bottom of the container.

Typically, the movable platen and screw conveyor are set within and attached to an elevator system to conveniently enable the positioning of the apparatus and drum which is to be emptied.

FIG. 1 is a front view of the apparatus according to the invention illustrating one embodiment wherein 10 is a conventional 55-gallon drum containing a thermoplastic hot melt adhesive, and 14 is a movable platen. The heating means is a serpentine hollow coil 12 in which hot oil is circulated, while 16 is the inlet port and 17 is the exit port for the hot oil. The platen drum seal is 13 and serves to peripherally contact and seal the platen to the drum. Vertically attached to the platen is the hollow cylinder 18 which contains the screw 11 and is provided with an outlet 20. The cylinder is optionally heated by a heating jacket 15. A motor drive 22 is attached to a gear box 23 which is fixed on a support and attached to a coupler 21 which in combination provides the necessary mechanical power to controllably drive or rotate the screw. The physical support for the apparatus is provided by 24 in combination with a hydraulic lifting means 25 which is adapted to provide the required positioning of the platen and screw conveyor within the container being emptied.

DETAILED DESCRIPTION

Figure 1:
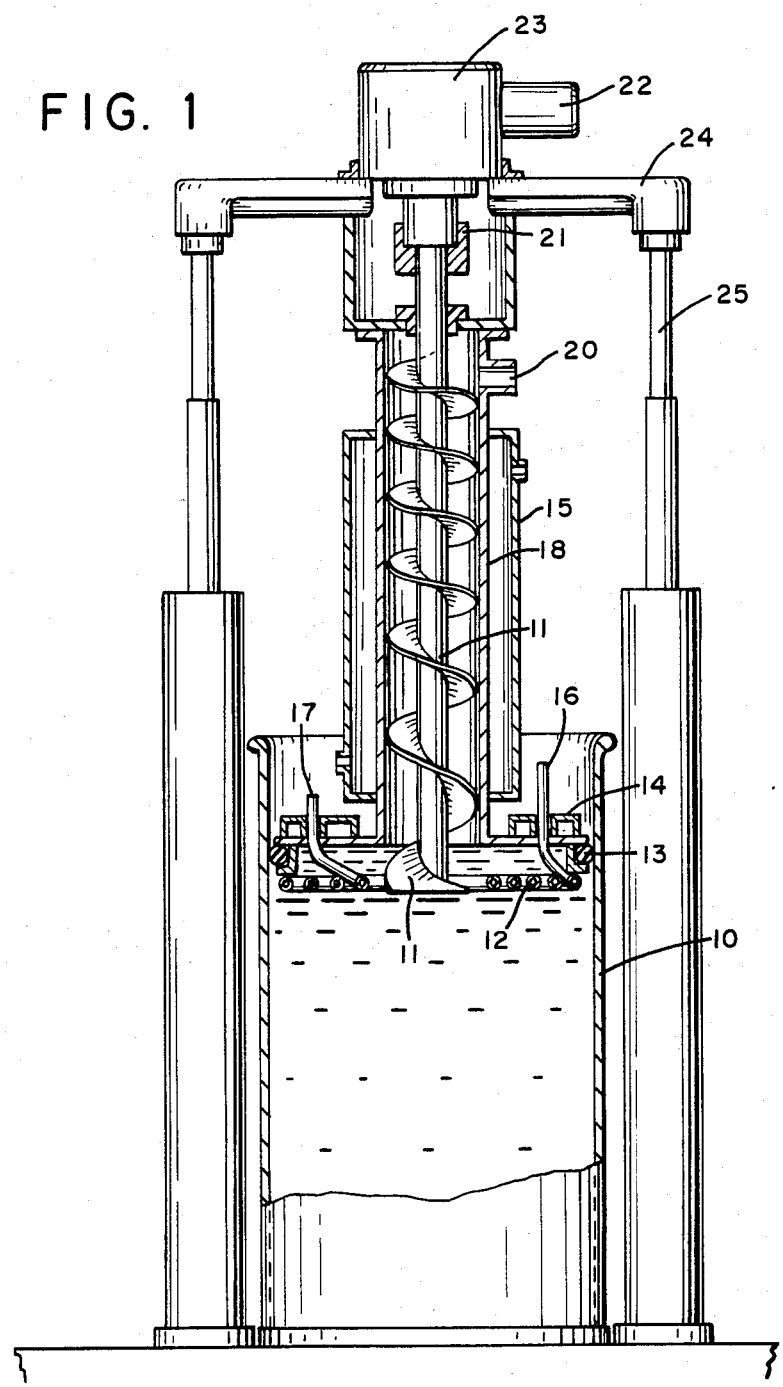

Heating System: The heating system which is attached to the bottom of the platen is constructed of such size, spacing and heating capability as to be suitable for use with a variety of materials which are contemplated for dispensing. Thus the heating system must be capable of quickly melting or highly softening the thermoplastic material in the container so that the screw (auger) can "lift" the softened or molten material in the upright cylinder. In preferred embodiments of the invention, a circular coil system is used in which steam or hot water or some other hot liquid is circulated. In other embodiments, electrical heating devices with appropriate heat dissipating fins can be used.

Movable Platen: The movable platen is disposed to move vertically in the container being emptied. Necessarily, the platen is of a size and is shaped to closely fit within the interior of the container. The periphery of the platen can optionally be contructed to carry a socalled drum seal. Such seal can be made of rubber, soft plastic, and the like, and the design of its attachment to the platen is not critical. Optionally, the platen can be constructed in a manner such that it can also be heated either by steam, hot water or other liquid, or electrically.

Screw conveyor: The screw conveyor comprises a hollow cylinder vertically disposed and extending through and attached to the movable platen. A closely fitted screw or auger is positioned within the cylinder which at is upper end is connected to means for mechanically and controllably rotating the screw. The upper diameter of the cylinder is closed but an outlet is provided through the cylinder wall in the upper portion of the cylinder which preferably is provided with tubing or piping.

The screw used within the cylinder is essentially a conveyor screw with a feed zone at its lower half and a compression zone at the upper half which passes the upper cylinder outlet. The pitch of the screw flightings is not considered critical and the practitioner can easily determine acceptable and preferable designs. Ordinarily, the pitch of the screw flighting for the lower half of the screw is about equal to the diameter of the screw and is about equal to one half of that pitch for the upper portion or discharge zone. The root diameter and pitch configuration of the screw may be varied along its length to obtain desired discharge properties. The screw is mechanically driven at speeds sufficient to initiate and continue the conveying action.

For most materials, it is necessary or preferable to heat the cylinder (with, for example, a heating jacket) and with some materials the area adjacent the outlet to prevent the conveyed material from hardening or solidifying.

It is an advantage of the present apparatus, however, that the materials to be conveyed and dispensed need not be fully melted and in a liquid state. Gel or semi-solid materials having a viscosity of about 300,000 cps or more can be conveyed without difficulty in the present apparatus as opposed to a limit of about 50,000 cps for materials conveyed or pumped by conventional, prior art systems.

It is also an advantage that the screw and cylinder inlet can be at the same level or substantially the same plane as the heating coils or fins because in operation of the apparatus the coils or fins soften not the actual material lifted by the screw but rather the material near and about screw.

Now that the preferred embodiments of the present invention have been described, various modifications and improvements thereon will become readily apparent to the practitioner. Accordingly, the spirit and scope of the invention are to be limited only by the appended claims, and not by the foregoing specification.

What is claimed is:

1. Apparatus for dispensing a high viscosity thermoplastic material from a container comprising
    (a) a movable platen adapted to enter the container through the top thereof, said platen being provided with seal means for peripherally contacting said container and a circular coil heating system defining a passage for steam or hot fluid disposed adjacent the underside of said platen for heating the high viscosity thermoplastic material;
    (b) a screw conveyor extending through said platen and operatively secured thereto for movement therewith, said screw conveyor having an inlet disposed below the underside of said platen and an outlet disposed above the top of said platen; wherein said screw conveyor comprises a hollow cylinder secured to said platen in a generally vertical disposition, a screw extending through the length of said cylinder and being configured and dimensioned to be snugly received by said cylinder, wherein the pitch of the screw flightings is about equal to the screw diameter for the lower half of the screw and about equal to one-half of that pitch for the upper half of the screw, and means for mechanically driving said screw; and
    (c) said apparatus further comprising additional heating means for heating at least a portion of said cylinder.

2. The apparatus of claim 1 wherein said inlet is disposed in substantially the same plane as said heating means.

3. The apparatus of claim 1 wherein said screw extends below said cylinder.

4. The apparatus of claim 1 wherein said heating means is adapted to heat the high viscosity thermoplastic material at said inlet only to a gel or semi-solid state characterized by a viscosity in excess of 50,000 cps.

5. The apparatus of claim 1 further comprising additional heating means for heating said outlet.

6. Apparatus for dispensing sealants or hot melt adhesives from a container comprising;
    (a) a movable platen adapted to enter the container through the top thereof, said platen being provided with seal means for peripherally contacting said container and a circular coil heating system defining a passage for steam or hot fluid disposed adjacent the underside of said platen for heating the high viscosity thermoplastic material;
    (b) a screw conveyor extending through said platen and operatively secured thereto for movement therewith, said screw conveyor having an inlet disposed below the underside of said platen and an outlet disposed above the top of the said platen; wherein said screw conveyor comprises a hollow cylinder secured to said platen in a generally vertical disposition, a screw extending through the length of said cylinder and being configured and dimensioned to be snugly received by said cylinder, wherein the pitch of the screw flightings is about equal to the screw diameter for the lower half of the screw and about equal to one-half of that pitch for the upper half of the screw, and means for mechanically driving said screw; and
    (c) said apparatus further comprising additional heating means for heating at least a portion of said cylinder.

* * * * *